Feb. 22, 1927. 1,618,906
G. S. BAKER
MACHINE FOR USE IN THE MANUFACTURE OF BISCUITS AND THE LIKE
Filed Feb. 8, 1922 3 Sheets-Sheet 1

INVENTOR:
George Samuel Baker.
ATTORNEYS Milans Milans

Feb. 22, 1927. 1,618,906
G. S. BAKER
MACHINE FOR USE IN THE MANUFACTURE OF BISCUITS AND THE LIKE
Filed Feb. 8, 1922    3 Sheets-Sheet 2
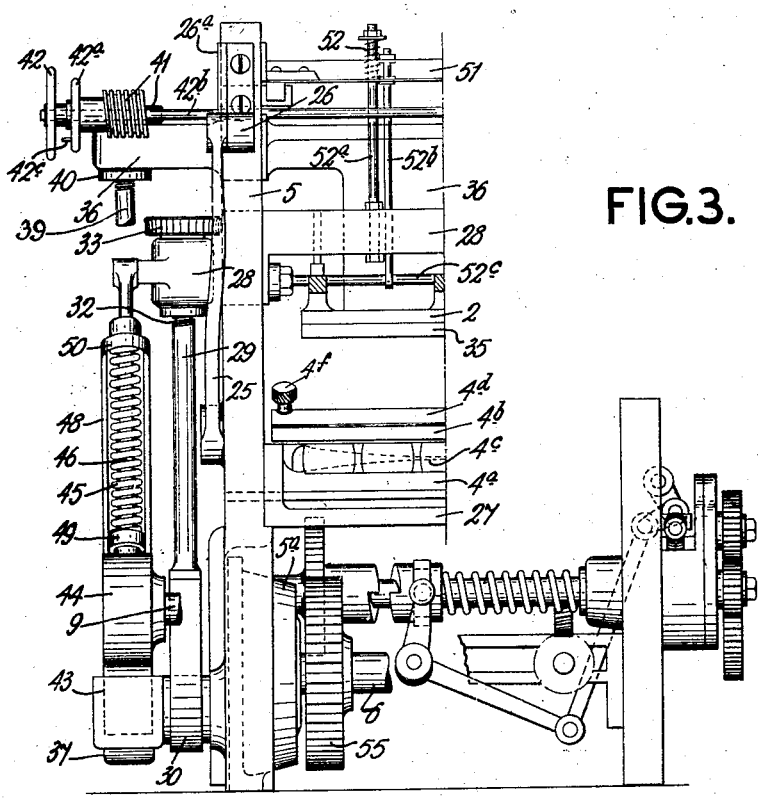
FIG.3.
FIG.1A.
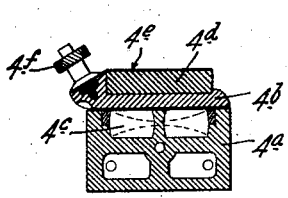
FIG.4.
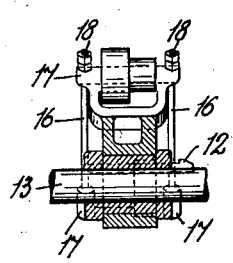
INVENTOR:
George Samuel Baker.
ATTORNEYS Patented Feb. 22, 1927.

1,618,906

UNITED STATES PATENT OFFICE.

GEORGE SAMUEL BAKER, OF LONDON, ENGLAND, ASSIGNOR TO JOSEPH BAKER, SONS AND PERKINS COMPANY INCORPORATED, OF WHITE PLAINS, NEW YORK.

MACHINE FOR USE IN THE MANUFACTURE OF BISCUITS AND THE LIKE.

Application filed February 8, 1922, Serial No. 534,910, and in Great Britain February 16, 1921.

This invention relates to machines for use in the manufacture of biscuits and the like, and of the general class in which a sheet of dough, paste or similar substance is passed on a conveyor or web over a table beneath a series of combined cutters and embossers which may serve also as ejectors, and is conveyed thence by said conveyor for example to be delivered to pans or equivalents, in which they are delivered to an oven or otherwise dealt with.

The invention comprises a number of novel or improved features of construction, detail and combinations of parts whereby the general construction of the machine is simplified, its function facilitated, and the operation rendered substantially continuous, the main feature of the invention consisting of a cutter head adapted to be rocked through a large arc about a pivot in the base of the machine as distinct from known devices in which two distinct movements viz. a horizontal and vertical are given to said cutter head. The said cutter head carries the cutters, embossers and ejectors. The invention is hereinafter described and pointed out in appended claims with reference to the accompanying drawings in which:—

Figure 1:
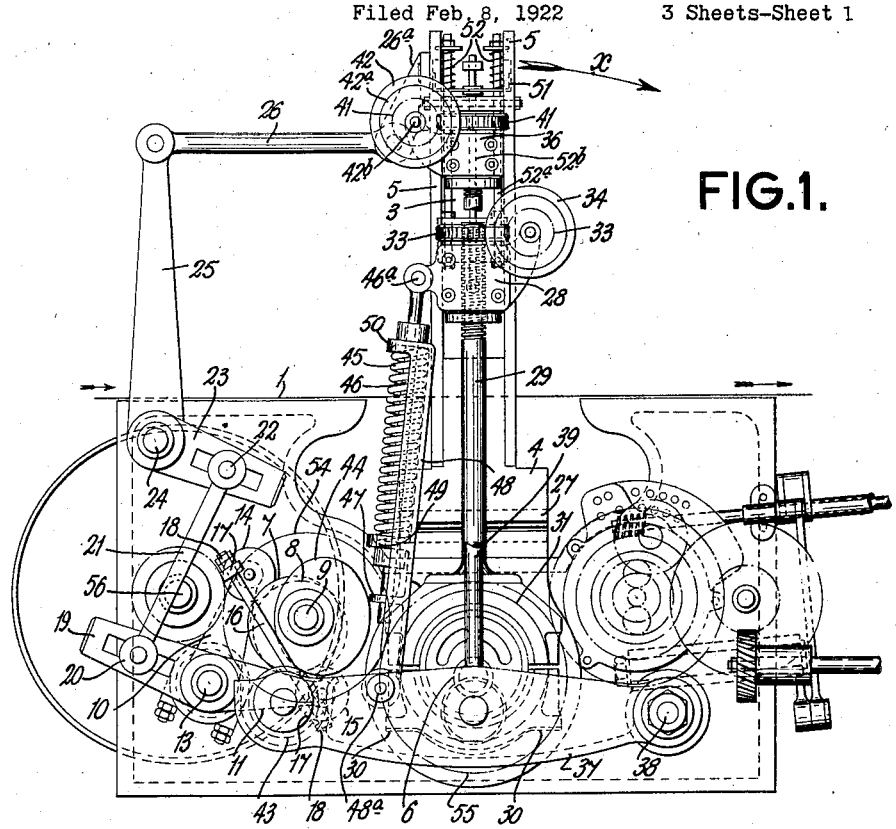
Figure 2:
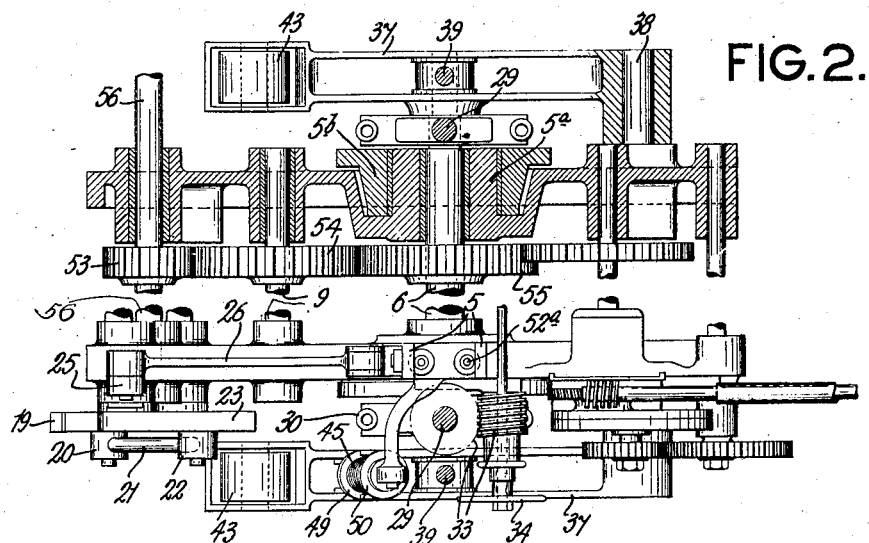
Figure 5:
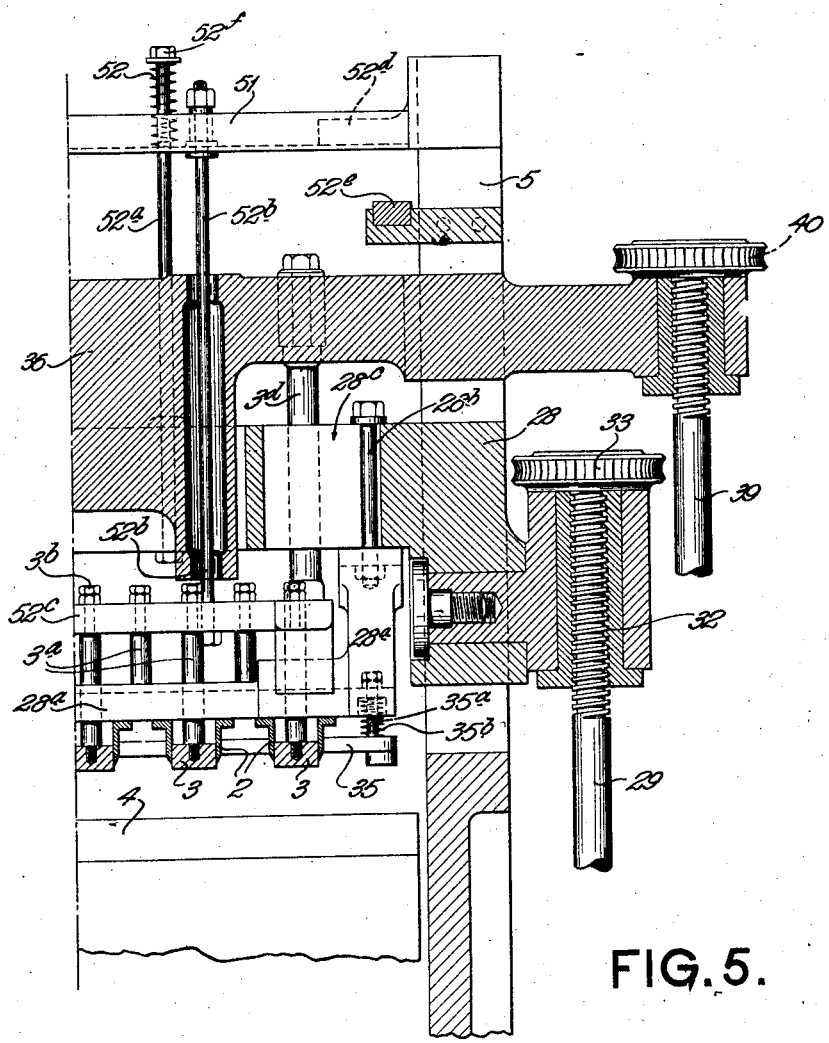

Fig. 1 is a side elevation of the movable cutter head and associated parts; Fig. 1ª is a detail view of parts shown in Figs. 1 and 3. Fig. 2 is a part plan, part horizontal section of Fig. 1 with parts omitted for clearness of illustration. Fig. 3 is a partial end view and part vertical section of Fig. 1. Fig. 4 is a detail sectional view of a cam-operated lever shown in Fig. 1, and Fig. 5 is a fragmental vertical section on an enlarged scale.

In the preferred embodiment of such a machine shown in the drawings the conveyor or web 1 which carries the sheet of dough is driven continuously, instead of intermittently as in most machines of the class referred to, and the entire cutting device, including the cutters 2, embossers and ejectors 3 and table 4 are mounted in side frames or supports 5 which are given a rocking movement through a wide arc about the axis of a shaft 6 at the base of the machine, the movement of said frames or supports 5 in the forward direction, viz., in the direction indicated by arrow $x$ in Fig. 1 being at the same speed as the movement of the dough supporting web 1 for the major part of said forward stroke.

The lower ends of the frames 5 are shown as enlarged to form conical eyes 5ᵇ rotatable in bosses 5ª extending from the side frames of the machine.

The cutting, embossing and ejecting movements of the respective elements are timed to take place while the rocking frames 5 carrying them are moving forwards at the same speed as the web; the cutters being clear of said web during the return stroke of the rocking frames.

The rocking motion of said frames 5 is imparted thereto by means of a duplex or multiple cam movement, a sectional detail view of part of which is also shown in Fig. 4. Each cam 7 and 8 (two being herein shown) is mounted on a common shaft 9 and co-operates with one arm 10, 11, respectively of a double bell crank or lever keyed as at 12 to a shaft 13, said cams bearing against rollers 14 and 15 carried by said arms which are shown as braced together or stiffened by lateral bolts 16 engaging lugs 17 on the arms and tensioned by nuts 18. The bell-crank also includes an arm 19 providing a slotted or adjustable sliding bearing 20 for one end of a link 21, the other end of which has a similar bearing at 22, in one arm 23 of another bell-crank pivoted to the machine frame at 24 and the other arm 25 of which is connected by a rod or link 26 to a bracket 26ª on one of the frames 5 at a point well above its fulcrum. The shaft 24 is carried across the machine, and another lever 25 with similar rod 26 are repeated at the other side of machine.

By means of the adjustable sliding bearings 20 and 22 the extent of angular rocking movement of the frames 5 may be varied according to requirements.

The construction and arrangement of the cams 7 and 8, lever arms 10, 11 and rollers 14, 15 is such that no lost-motion or slackness exists between these parts and the movement of the rocking frames 5 is positive in both directions.

The cutting table 4 is mounted between the frames 5 and is stationary therein as regards any vertical adjustment, being carried by a cross frame 27 bolted to said frames. Fig. 1ª is a cross section of the table 4 and shows a conventional construction, comprising the table frame 4ª, top 4ᵇ with interposed resilient buffers 4ᶜ and block 4ᵈ over which is stretched the usual cloth or like covering $4^e$ secured by screws $4^f$.

The cutters 2 are mounted in the rocking frames 5 in a substantially known manner, that is to say, they are carried by a crosshead 28 adapted for vertical sliding movement in the frames, to which crosshead motion is imparted to perform the cutting operation by means of a rod 29 (one at each side of the machine) connected to a sheave 30 in which works an eccentric 31 mounted on the same shaft 6 as that about which the rocking frames 5 and associated parts have movement.

Fig. 5 shows the mounting of the cutters 2 in the cross head 28 by means of a frame $28^a$ extending across the machine and carried by bolts $28^b$ (one shown in said figure) extending through slots $28^c$ in the crosshead.

The cutter cross-head 28 is adjustably mounted on said rods 29 as at 32, and controlled as by means of worm gear 33 operated by a hand wheel 34 to vary its stroke and the position of the cutters in relation to the table and consequently the depth of cut of the cutters when necessary. In Figs. 3 and 5, 35 designates the scrap or stripper plate commonly provided in this class of machine and resiliently suspended by means of bolts $35^a$ and springs $35^b$ from the cutter cross head frame $28^a$.

The embossers and ejectors 3 are contained within the cutters and mounter independently thereof as is customary in this class of apparatus, this arrangement being shown in Fig. 5 in which said ejectors which also normally act as embossers are shown as carried by rods $3^a$ attached by nuts $3^b$ to a frame $52^c$ which is connected at its ends by rods $3^d$ (one shown in Fig. 5) suspended from another crosshead 36, adapted for vertical sliding movement in the rocking frames 5. The ejectors and embossers are given their necessary movements by means of a pair of rocking arms 37 one at each side at the base of the machine. One end of each of said arms is fulcrummed to the machine frame at 38 and to a suitable part of said arm is coupled the lower end of a rod 39. (Fig. 3) the upper end of which is adjustably attached as at 40 to the embosser-crosshead 36. Worm gear 41 operated by hand wheels 42 and $42^a$ is shown for effecting the adjustment to control the degree of relative movement between the embossers and cutters for embossing and ejecting purposes according to requirements.

The adjustments of both the cutter crosshead and the embosser cross-head are preferably effected from the same side of the machine at different points or alternatively also from both sides, for which purpose as regards the embosser cross-head the hand wheel $42^a$ and shaft $42^b$ effects the adjustment at the opposite side of the machine and when the adjustments at the respective sides have been made the two hand wheels may be locked together by castellation $42^c$ or equivalents in order that further adjustments may be effected simultaneously at both sides. The adjustments for the cutter cross-head are similarly arranged (see hand-wheel 34).

The free end of each rocking arm 37 carries a roller 43 acted on by a cam 44 (Fig. 1) mounted on the same shaft 9 as the cams 7, 8 for rocking the frames 5. The said rollers 43 are acted upon by a compensating spring 45 which is shown as coiled about a rod 46 connected at its uper end at $46^a$ to the cutter head 28 and at its lower end slidably engaging a lug 47 on a bar 48 the lower end of which is attached to the rocking arm 37 at point $48^a$ and through the upper end of which the rod 46 slides, the said spring 45 bearing at opposite ends between lugs 49 and 50 on said bar. This construction compensates for any difference of relative movement between the cutter cross-head 28 and the embosser cross-head 46: it also permits the maintenance of operative engagement between the cams 44 and rollers 43 in spite of the relative rocking movements of the frames 5 and arms 37 respectively, and relieves the cam-motion of undue stress during the working stroke.

Where it is required to operate the machine without using the embossing mechanism, it is usual to attach to an ejector plate a weight which, as the cutters descend, holds said ejector plate on the dough while the biscuits are being cut out from the sheet of dough and then, as the cutters rise from the dough, ejects the cut biscuits and scrap. Where the cutters and associated parts are rocked during the cutting operation, as in the present invention it is desirable that such weight should be replaced by a cross bar 51, adapted to slide vertically in the side cutter frames 5 and loaded with the desired pressure by a number of compressed springs so that the rocking portion of the machine may be as light as possible. When so operating the machine the embosser cross head 36 is put out of action by disconnecting its operating rods 39 and remains stationary. A rod $52^a$ (one at each side) is connected to the cutter cross head 28 and extends upwards through the bar 51 above which it is surrounded by a coiled spring 52 held by a nut $52^f$. On descent of said cross head, the rod $52^a$ by the action of the spring 52 pulls down the cross bar 51 until a lug $52^d$ integral therewith engages an abutment $52^e$ on the side frame 5 and through a connecting rod $52^b$ between the bar 51 and the stripper plate 35 the latter is held at a predetermined distance from the cutting table 4 while the cutting takes place. When embossing the rod $52^b$ is dispensed with. The stripper plate remains in this position during the first part of the return movement of the cutters 2 thereby stripping the scrap, and the ejectors remaining stationary and biscuits are afterwards ejected.

The cams 7 and 8 and 44 respectively for operating the rocking frames 5 and embosser cross-head 36 and the shaft 6 for operating the cutter cross-head 28 are driven through a suitable train of spur-gear 53, 54, 55, from a main drive-shaft 56.

In the claims which follow the terms "biscuits" and "dough" are held to include any like product, or material from which such product is produced, within the capabilities of the mechanism forming the subject matter of said claims.

What I claim as my invention and desire to secure by Letters Patent of the United States is:—

1. A machine of the character described for the manufacture of biscuits and the like including a frame adapted for swinging movement, cutters carried by the frame, a bell crank lever, means connecting the bell crank lever and frame, and means engageable with the opposite ends of the bell crank lever for swinging the frame in opposite directions.

2. A machine of the character described for the manufacture of biscuits and the like including a frame adapted for swinging movement, cutters carried by the frame, a bell crank lever, means connecting the bell crank lever and frame, and cams engageable with the opposite ends of the bell crank lever for swinging the frame in opposite directions.

3. A machine of the character described for the manufacture of biscuits and the like including a frame adapted for swinging movement, cutters carried by the frame, a bell crank lever, adjustable means interposed between and connected to the bell crank lever and frame, and cams engageable with the opposite ends of the bell crank lever for swinging the frame in opposite directions, the adjustable means interposed between the frame and bell crank lever being adapted to vary the degree of swinging movement of the frame.

4. A machine of the character described for the manufacture of biscuits and the like including a frame adapted for swinging movement, a cross head carried by the frame and adapted for reciprocating movement, cutters carried by the cross head, a second cross head carried by the frame and adapted for reciprocating movement, ejector mechanism carried by the second mentioned cross head, a bell crank lever, means connecting the bell crank lever and frame, means engageable with the opposite ends of the bell crank lever for swinging the frame, means for reciprocating the cross head carrying the cutters, a pivoted lever, means connecting the pivoted lever and the cross head carrying the ejecting mechanism, and means engageable with the lever for reciprocating the cross head.

5. In a machine for the manufacture of biscuits and the like the combination with a cutter crosshead and an ejector crosshead mounted for relative movement and operating cams for moving said ejector crosshead, of a spring device for maintaining the ejector mechanism in contact with said operating cams and ensuring correct relative movement between said crossheads, said spring device comprising lateral rocking cam operated arms, connections from said arms for operating the ejector crosshead, telescoping members connected respectively to said arms and to the cutter crosshead and springs inserted between said telescoping members.

In witness whereof I have signed this specification.

GEORGE SAMUEL BAKER.